United States Patent Office 3,274,351
Patented Sept. 20, 1966

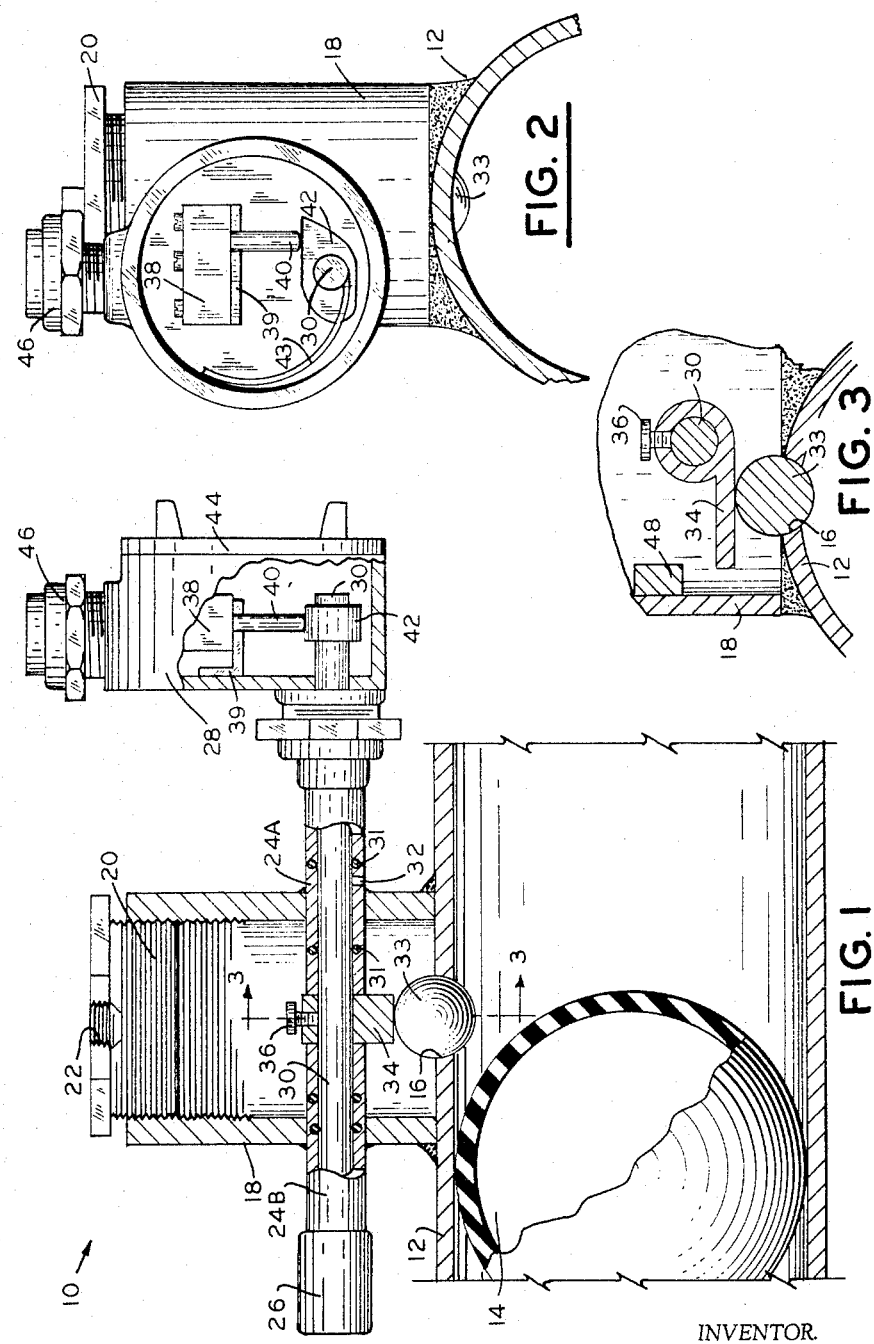

3,274,351
SWITCH FOR DETECTING PISTON IN FLUID FLOW LINE
Joseph C. Halpine and Bernard M. Moroney, Tulsa, Okla., assignors to Halmor Industries, Inc., Tulsa, Okla., a corporation of Oklahoma
Filed Dec. 13, 1963, Ser. No. 330,434
2 Claims. (Cl. 200—61.41)

This invention relates to a detector switch. More particularly, the invention relates to a detector switch adaptable for positioning on a pipe to detect the passage of a physical object, such as a ball or a piston, therethrough.

In recent years in the petroleum industry a trend towards lease automatic custody transfer of crude oil has developed. Lease automatic custody transfer, termed LACT, provides a method whereby crude oil which is produced by an oil field lease is automatically transferred to a pipeline company which transports it to a refinery or storage facility. Meters are the most commonly used method of determining the quantity of crude oil which is automatically transferred. The crude oil is pumped from the producers' storage facilities through one or more meters to the pipeline company facilities. Since crude oil is a relatively valuable liquid and is usually transferred in fairly large quantities at rapid rates, it is extremely important that accurate measurements are made by the meter or meters as the crude oil is transferred.

In order to insure accuracy of the metering of the transfer of the crude oil, methods have been developed for the calibration of meters. One method includes the use of a pipe, having a piston positioned in it. By empirical tests the exact amount of liquid flowing through the pipe required to move the piston from one position to another can be accurately determined. Valving means are used to direct the crude oil passing through a meter into the pipe, moving a piston in the pipe by the force of liquid flow. The meter quantity registration indicated by the movement of the piston from an initial position in the pipe to a predetermined second position will give an accurate calibration of the accuracy of the meter.

A further refinement of this system includes the use of a relatively long pipe, which serves as the cylinder, and a ball which serves as the piston, the ball being of an external diameter substantially equal to the internal diameter of the pipe. The movement of the ball through the pipe as crude oil flows through it accurately indicates the quantity of fluid flow.

When a metallic piston is used, detection of the position of the piston as it moves along the length of a pipe can be made by electrical or electronic means. When a flexible ball, of a material such as rubber, is utilized as the piston, the detection must be by some physical means since the rubber ball will ordinarily not be useful to actuate any type of electronic or magnetic detector. This invention provides a means of physically detecting the passage of a piston, such as a ball, in a pipe.

It is therefore an object of this invention to provide a piston detector switch adaptable for use in conjunction with a pipe, to detect the passage of a piston through the pipe.

Another object of this invention is to provide a detector switch which is readily adaptable for mounting on a pipe wherein a minimum amount of work is required to mount the detector switch onto the pipe.

Another object of this invention is to provide a detector switch which may be made of readily available and inexpensive components and which may therefore be economically constructed.

Another object of this invention is to provide a piston detector switch having improved means of pressure sealing the fluid in the pipe to prevent leakage of the fluid.

Another object of this invention is to provide a detector switch having improved means of adjusting the switch relative to the actuating mechanism whereby the switch may be accurately calibrated to indicate the passage of a piston thereby.

Another, and an important object of this invention, is to provide a piston detector switch including improved means of detecting the passage of the piston in such a way that a minimum resistance to the passage of the piston is imposed by the switch and in a manner precluding the possibility of the piston becoming caught or trapped by the switch.

These and other objects and a better understanding of the invention may be had by referring to the following description and claims taken in conjunction with the attached drawings in which:

FIGURE 1 is a cross-sectional view of the piston detector switch of this invention positioned on a pipe for detecting the passage of a piston through the pipe.

FIGURE 2 is an end view of the piston detector switch of this invention shown affixed to a pipe and showing the cover of the switch housing removed.

FIGURE 3 is a cross-sectional view taken along the line 3—3 of FIGURE 1 showing the arrangement of the actuator cam and ball member of the invention.

This invention may be described as a piston detector switch. More particularly, but not by way of limitation, the invention may be described as a piston detector switch adapted to be positioned in a fluid tight manner over an opening in the upper surface of a pipe, said piston detector switch comprising a housing secured in a fluid tight manner to the upper outside surface of the pipe over said opening, a ball of a diameter slightly larger than the diameter of said opening in said pipe loosely and rotatively positioned in said opening in said pipe, whereby a portion of said ball normally protrudes within the interior of said pipe, an actuator arm pivotally supported in said housing, said actuator arm engaging the upper surface of said ball, and a switch means actuated by the pivotation of said actuator arm.

Referring now to the drawings and first to FIGURE 1, the piston detector switch of this invention is indicated generally by the numeral 10. The piston detector switch is shown affixed to the upper surface of a large diameter pipe 12. In typical operation, the switch of this invention is utilized in conjunction with a meter prover system wherein a piston, such as a resilient ball 14, is moved by fluid flow through the pipe 12. By means of one or more piston detector switches 10 the passage of the ball 14 is accurately determined.

Formed in pipe 12 is an opening 16, preferably of a cylindrical configuration. Surrounding the opening 16 and affixed to the pipe is an upstanding hollow, preferably tubular, body member 18. The body member 18 may be affixed to pipe 12 in a variety of ways but the preferred method is as shown, that is, by welding. The upper end of body member 18 is closed, such as by means of a plug member 20, which may be provided with a threaded opening 22 useful as a means for attaching a valve, guage, or other testing equipment. Supported to the body member 18 is a first and second tubular shaft housing 24A and 24B. The housing 24B is closed, at the outer end, such as by means of a cap 26. The outer end of tubular shaft housing 24 supports a switch housing 28. Rotatively supported in the tubular shaft housing 24A and 24B is a cylindrical shaft 30 which extends and terminates within the switch housing 28.

To prevent the leakage of gas or liquids past shaft 30 O-ring gaskets 31 may be provided in the shaft housing 24A. To further diminish the possibility of fluid being conducted into switch housing 28 a weep hole 32 is provided in the shaft housing 24A exteriorly of body member 18.

Loosely and rotatively supported in opening 16 formed in pipe 12 is a ball member 33. The ball member 33 is of a diameter slightly larger than the diameter of opening 16 so that the ball member will, in its normal position, extend partially within the interior of pipe 12 but, cannot fall into the pipe. Affixed to shaft 30, and interposed between the ends of shaft housing 28A and 28B, is an actuator cam 34, held to the shaft 30 by means of a threaded bolt 36.

Referring to FIGURE 3 it can be seen that the actuator cam 34 extends to engage the upper surface of ball 33 to constrain the ball 33 within opening 16. When ball 32 is pushed upwardly by passage of a piston, actuator cam 34 pivots shaft 30.

As shown in FIGURES 1 and 2 a switch, such as a microswitch 38 is supported within switch housing 28. A switch actuating plunger 40, being a part of the switch 38, extends downwardly therefrom. Affixed to the end of shaft 30 within the switch housing 28 is a switch cam 42. When shaft 30 is rotated by the upward movement of ball 33 against actuator cam 34, switch cam 42 likewise rotates to actuate switch 38 by the longitudinal displacement of switch plunger 40.

As shown in FIGURE 1, switch housing 38 is preferably provided with a cover 44, as a means of providing ready access to switch 38. A conduit receiving coupling 46 is provided as a means of affixing a conductor carrying pipe to the switch housing.

In order to keep the switch, actuator rod 40 in the normal downward position and to keep ball 33 pressed downward to sense the passage of a piston therepast, a spring 43 is utilized. (See FIGURE 2.) Spring 43 may be affixed either to cam 42 or directly to shaft 30 to rotatively bias shaft 30 and thereby actuator cam 34 against ball 33.

So that some sudden encounter of a piston or other object against ball 33 will not dislodge it from its seat in hole 16, the movement of actuator cam 34 is limited by a stop 48 affixed to the interior surface of body member 18.

OPERATIONS

The switch of this invention is utilized to detect the the movement of a piston in a pipe past the switch. By the word "piston" is included any physical object of approximately full pipe diameter utilized in pipes, such as a pipe scraper, a pig, a product separator or etc. In the illustrations, a ball 14 is utilized in the manner commonly encountered in meter provers as presently utilized extensively in the petroleum industry. When the ball or any other type of meter passes the detector switch the periphery thereof encounters ball member 33 loosely and rotatively positioned in opening 16 in pipe 12. Due to the inherent characteristic of the ball 33 a piston 14 encountering it causes the ball 33 to easily move upwardly and at the same time rotate in socket—like opening 16. In meter prover operations it is important that the piston 14 pass the point of detection without any restriction to its movement and, in a manner precluding the possibility of its being caught or trapped by the detection device. In the novel provision of this invention wherein a ball 33 is utilized in a socket-like opening 16 there is no opportunity for the piston 16 becoming trapped thereon. The ball member 33, being free to move upwardly and rotate, if necessary, by the movement of piston 14, means that a minimum restriction is placed upon the free movement of piston 14 past the detector switch.

The upward movement of the ball 33 is communicated by actuator cam 34, shaft 30, switch cam 42 and actuator plunger 40 to switch 38. The degree of displacement of ball 33 to actuate switch 30 is easily adjusted by means of positioning of actuator cam 34 relative to shaft 30 which in turn is easily adjusted by bolt 36. Removal of plug member 20 readily exposes bolt 36 for adjustment.

Although this invention has been described with a certain degree of particularity, but it is manifest that many changes may be made in the details of construction and the arrangement of components without departing from the spirit and scope of this disclosure.

What is claimed:

1. A piston detector switch adapted to be positioned on a pipe having a small diameter opening in the upper surface thereof to detect the passage of a piston in the pipe moving in either direction, said piston detector switch comprising:

a hollow upstanding body member sealably affixed to said pipe encompassing said opening in said pipe;

a tubular shaft housing affixed to and communicating with the interior of said body member and extending substantially in a plane parallel the plane of said pipe;

a shaft rotatively supported in said shaft housing having one end thereof extending within said hollow body member;

a ball of a diameter slightly larger than the diameter of said opening in said pipe, said ball loosely and rotatively positioned in said opening in said pipe and within said hollow body member whereby a portion of said ball normally protrudes within the interior of said pipe;

an actuator cam member affixed at one end to said shaft within said hollow body member, said actuator cam member extending to engage the upper surface of said ball whereby the displacement of said ball rotates said shaft;

an enclosed switch housing supported to and communicating with said tubular shaft housing, the other end of said shaft terminating within said switch housing;

a microswitch having an actuator plunger extending therefrom, the microswitch supported in said switch housing and adjacent said shaft; and a switch cam affixed to said shaft within said housing, said cam engaging said switch actuator plunger to depress said actuator plunger upon the rotation of said shaft by the displacement of said ball.

2. A piston detector switch according to claim 1 including spring means within said switch housing resiliently urging said switch cam in the direction of rotation of said shaft which normally constrains said actuator cam in engagement with said ball.

References Cited by the Examiner

UNITED STATES PATENTS

| 1,684,905 | 9/1928 | Bastian. | |
| 2,507,066 | 5/1950 | Trautman | 200—839 |
| 2,698,363 | 12/1954 | Rush | 200—61.41 |
| 2,841,667 | 7/1958 | Stowe | 200—81.9 |
| 3,145,274 | 8/1964 | Van Scoy et al. | 200—61.41 |

BERNARD A. GILHEANY, *Primary Examiner.*

H. M. FLECK, *Assistant Examiner.*